(12) United States Patent
Shu et al.

(10) Patent No.: US 7,145,738 B2
(45) Date of Patent: Dec. 5, 2006

(54) DRIVING MECHANISM FOR A CAMERA LENS

(75) Inventors: Mao-Zen Shu, Hsinchu (TW); Wen-Tsai Hsu, Hsinchu Hsien (TW)

(73) Assignee: Arima Computer Corporation, Taipei (TW)

( * ) Notice: Subject to any disclaimer, the term of this patent is extended or adjusted under 35 U.S.C. 154(b) by 26 days.

(21) Appl. No.: 11/052,805

(22) Filed: Feb. 9, 2005

(65) Prior Publication Data

US 2006/0176589 A1 Aug. 10, 2006

(51) Int. Cl.
*G02B 7/02* (2006.01)
*G02B 15/14* (2006.01)

(52) U.S. Cl. .................. 359/824; 359/823; 359/696

(58) Field of Classification Search ................ 359/824, 359/823, 814, 696, 697, 700–704; 250/201.7
See application file for complete search history.

(56) References Cited

U.S. PATENT DOCUMENTS

| | | | | |
|---|---|---|---|---|
| 4,626,077 A | * | 12/1986 | Yamamoto | 359/696 |
| 4,634,221 A | * | 1/1987 | Hopfner | 359/824 |
| 4,750,821 A | * | 6/1988 | Yamamoto et al. | 359/697 |
| 4,793,689 A | * | 12/1988 | Aoyagi et al. | 359/825 |
| 4,828,360 A | * | 5/1989 | Maruyama | 359/824 |
| 5,138,497 A | * | 8/1992 | Blanding | 359/823 |
| 5,220,461 A | * | 6/1993 | Inoue et al. | 359/824 |
| 5,499,143 A | * | 3/1996 | Sakamoto et al. | 359/824 |

\* cited by examiner

*Primary Examiner*—Loha Ben
(74) *Attorney, Agent, or Firm*—Pai Patent & Trademark Law Firm

(57) ABSTRACT

A camera lens drive mechanism includes a lens cylinder, and the lens hollow is able to fit over a lens. A conductor coil is wound around an outer surface of the lens cylinder, and a coil spring is surrounding the lens hollow cylinder. A magnetic body is opposite to the conductor coil for the magnetic line of force from the magnet can cut across the conductor coil. An active force is induced on the coil when a current is conducted in the conductor coil, and then the lens cylinder is pushed also. The magnitude of the active force can be controlled by adjusting the magnitude of the current in the conductor coil.

17 Claims, 3 Drawing Sheets

DRIVING MECHANISM FOR A CAMERA LENS

BACKGROUND

1. Field of Invention

The present invention relates to a driving mechanism for a camera lens. More particularly, the present invention relates to a driving mechanism for an auto-focus camera lens.

2. Description of Related Art

Due to advances in photography, almost all modern camera equipment has the ability to focus such that an object can be clearly imaged in the camera no matter whether the object is near or far. Adjusting the lens makes the light irradiated into the camera aggregated at an optimum position, the so-called focus, and then an image can be clearly recorded by the camera.

Manual focus is used for tronal cameras; in other words, the position of a traditional camera lens is manually adjusted to a point determined by a user's naked eye. Although advanced users may obtain a better effect by manual focus, it may be too difficult for amateur users; therefore, the fully automatic camera has been presented to the public. A fully automatic camera can automatically determine a proper focal distance before an image is recorded; thus, the difficulty in using the camera and the possibility of a faulty focus can be reduced.

Generally, there are a processor and a lens driving mechanism in a camera for the simple auto-focus method. The processor has the ability to receive a light signal and determine the optimum lens position by some algorithms, and then the lens is shifted to that optimum position by the lens driving mechanism. An ordinary driving mechanism uses a typical rotary motor to shift a lens, and because the lens must shift straight back and forth, a transmission is needed between the rotary motor and the lens for transforming a rotary motion to a linear motion. Generally, the transmission is achieved by a cam and a gear wheel mechanism, making the transmission extensive and hard to apply in portable products, such as mobile phones.

Furthermore, according to the tendency for electronic products to be integrated, a camera may not only be a camera, but also a mobile phone or a PDA (personal digital assistant); thus, miniaturization of an electronic product is an important consideration. In the traditional lens driving method, both the rotary motor and also the transmission occupy a large volume. Consequently, the limitations of traditional cameras with respect to miniaturization are obvious.

According to the foregoing description, a lens driving mechanism with more accuracy, better control ability and less volume is certainly needed because modern standards of focusing accuracy and miniaturization of products are critical.

SUMMARY

It is therefore an objective of the present invention to provide a lens driving mechanism with good control ability.

It is another objective of the present invention to provide a lens driving mechanism with high position accuracy.

It is still another objective of the present invention to provide a lens driving mechanism with a small volume.

It is another objective of the present invention to provide a lens driving mechanism with low cost.

In accordance with the foregoing and other objectives of the present invention, the lens driving mechanism comprises a mechanism cylinder, a magnetic body (made by a permanent-magnet material), a conductor coil, an elastic component, a lens cylinder and a lens. Both the mechanism cylinder and the lens cylinder are hollow and have an opening at both ends, wherein the mechanism cylinder is large enough to contain the lens cylinder. The lens is fastened in the lens cylinder, and the conductor coil encircles an outer surface of the lens cylinder, wherein the lens cylinder has a flange perpendicularly extending from its outer surface for bearing the elastic component such that the elastic component can surround the lens cylinder. The magnetic body is fastened on an inner surface of the mechanism cylinder such that the magnetic body can face at least one part of the conductor coil when the lens cylinder is placed into the mechanism cylinder; that is to say, there is at least one part of the conductor coil in the magnetic line of force of the magnet at any time and the magnetic line of force perpendicularly cuts across the conductor coil.

When the conductor coil conducts electrical current, a force is induced to push the lens cylinder because the directions of the current and the magnetic line of force are vertical, and the magnitude of the current and the magnetic line of force are directly proportional. The translation of the lens cylinder makes the flange closer and closer to the magnetic body, and then the elastic component exerts a reactive force to the lens cylinder because the elastic component is compressed between the flange and the magnetic body. Thus, the positions of the lens cylinder and the lens element within it are determined by controlling the magnitude of the current for counterbalancing the active force and the reactive force. The positioning accuracy of the lens can be enhanced also, simply by precisely tuning the current magnitude.

It is to be understood that both the foregoing general description and the following detailed description are by examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1A:
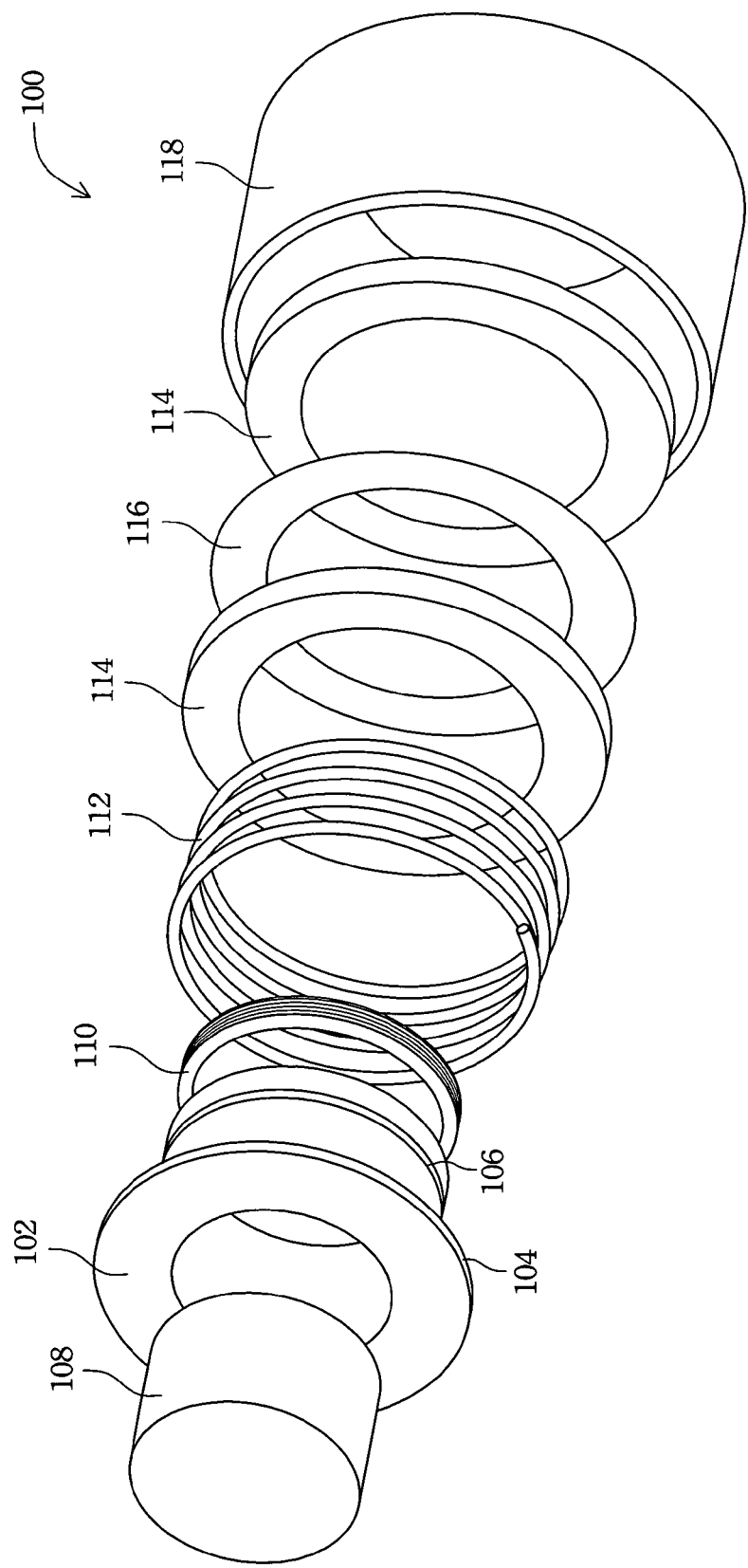
FIG. 1A illustrates an exploded view of a lens driving mechanism according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The basic concept of the present invention is using an active force induced by the interaction of electric current and the magnetic line of force to control the position of a lens. In this way, the lens can be linearly driven forward and backward without any additional part motion but with a high positioning accuracy and by simple control.

FIG. 1A illustrates an exploded view of a lens driving mechanism according to an embodiment of the present invention, showing the main elements of a lens driving mechanism 100, including a lens cylinder 102, a lens 108, a conductor coil 110, a coil spring 112, two magnetic bodies 114, an inner yoke 116 between the magnetic bodies 114 and a mechanism cylinder 118 used to envelop the whole driving mechanism.

The lens cylinder 102 is able to firmly house the lens 108, and the conductor coil 110 is wound and fastened onto the outer surface of the lens cylinder 102. In this embodiment, the conductor coil 110 is fastened by winding the conductor coil 110 in a trench 106 in the outer surface of the lens cylinder 102. Moreover, a flange 104 extends from the outer surface of the lens cylinder perpendicularly. When the coil spring 112 surrounds the lens cylinder, the flange 104 contacts the coil spring 112 to bear the spring 112 such that the lens cylinder will not pass through the coil spring 112.

The mechanism cylinder 118 is able to contain all the foregoing elements, that is, the lens cylinder 102, which contains the lens 108 and is encircled by the conductor coil 110 and surrounded by the spring 112. Two annular magnetic bodies 114 and an inner yoke 116 between the magnetic bodies 114 are all fastened on an inner surface of the mechanism cylinder 118.

Figure 1B:
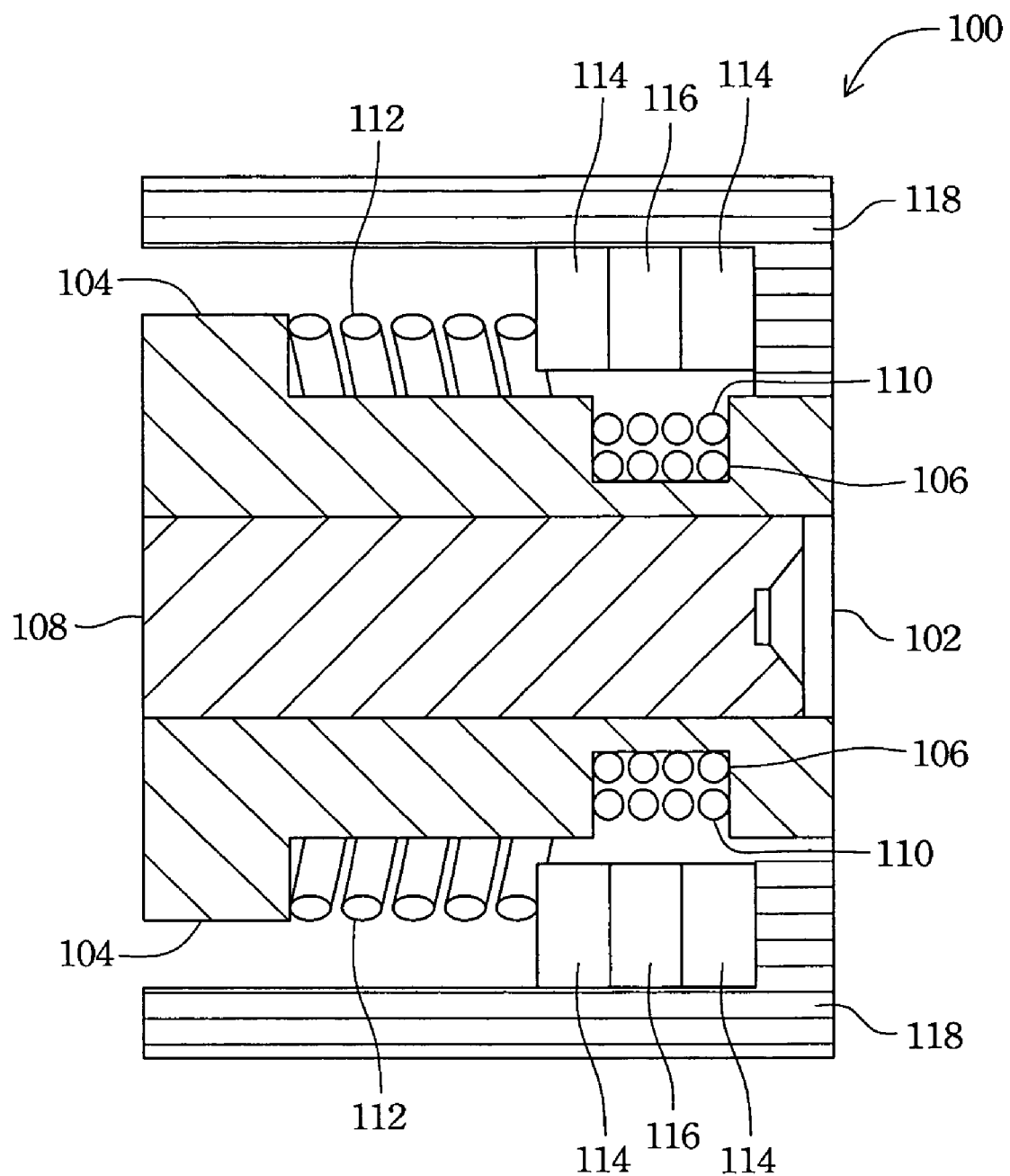
FIG. 1B illustrates a cross-sectional view of a lens driving mechanism according to an embodiment of the present invention.

FIG. 1B shows a cross-sectional view of the lens driving mechanism 100 comprised of the elements shown in FIG. 1A, clearly depicting the relative position of every element. First, the lens cylinder 102 contains the lens 108, the outer surface of the lens cylinder is encircled by the trench 106, the conductor coil 110 is wound along the trench 106, the coil spring 112 surrounds the lens cylinder 102, and one end of the coil spring 112 contacts the flange 104 of the lens cylinder 102. Then, the mechanism cylinder 118 with two magnetic bodies 114 and the inner yoke 116 between the magnetic bodies 114 disposed on the inner surface of the mechanism cylinder is used to house the whole lens cylinder 102, such that the magnetic bodies 114 and the inner yoke 116 face the conductor coil 110; that is to say, the magnetic line of force from the magnetic bodies 114 cuts across the conductor coil 110. Furthermore, according to FIG. 1B, when pushed by the lens cylinder 102 toward the right-hand side, the coil spring 112 is compressed between the flange 104 and the magnetic bodies 114.

Figure 2A:
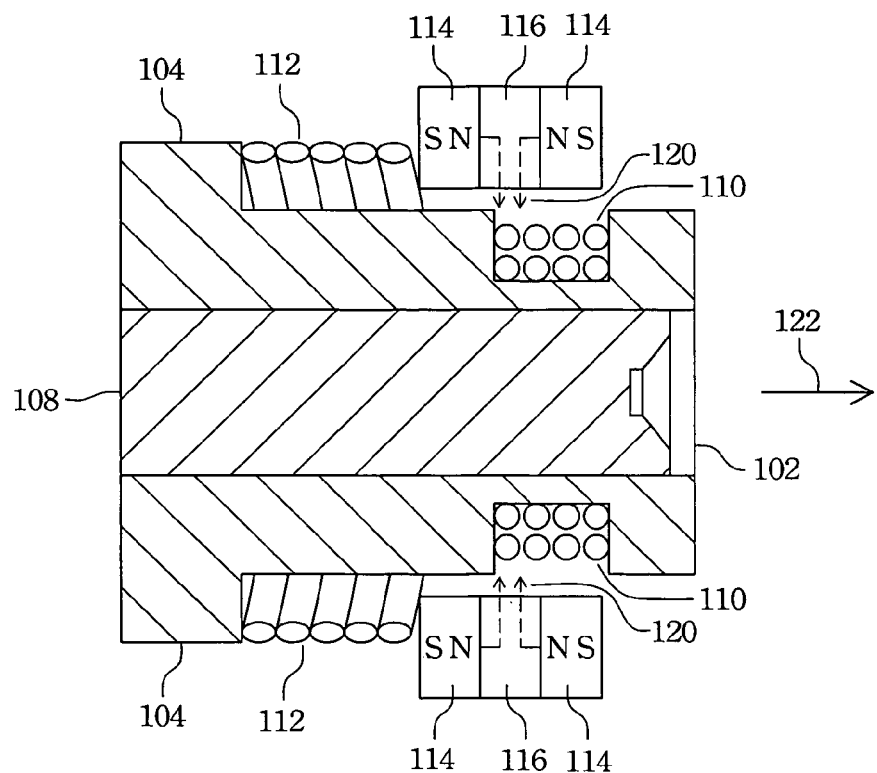
FIG. 2A is a diagram of a lens driving mechanism in motion according to an embodiment of the present invention.

FIG. 2A shows a way to control the position of a lens according to an embodiment of the present invention. The mechanism cylinder 118 shown in FIG. 1B is not shown in FIGS. 2A and 2B since the mechanism cylinder 118 in the lens driving mechanism 100 is immoveable. It can be seen that a surface of both magnetic bodies, which contacts the inner yoke 116, is a positive pole, and the reverse side is a negative pole. According to the characteristics of the magnets, the magnetic line of force is from the positive pole to the negative pole of a magnet. Therefore, the inner yoke 116 is able to guide a segment of the magnetic line of force from the magnetic bodies 114 shown in FIG. 2A to the conductor coil 110; that is, a magnetic line of force 120 cuts across the conductor coil 110.

According to the Lorentz Law, an active force F toward a direction 122 is induced on the conductor coil 110 while the conductor coil 110 conducts electrical current, where the magnitude of the active force F is:

$$F = rlL \times B$$

wherein, l is the magnitude of the current in the conductor coil 110;
L is the total length of the conductor coil 110;
B is the magnetic flux density; and
r is the proportion of the length of the conductor coil 110 exposed in the magnetic field to the total length of the conductor coil 110.

In this embodiment, both the total length L of the conductor coil 110 and the magnetic flux density B of the magnetic line of force 120 cutting across the conductor coil 110 are constants, and the proportion r is 1 because the entire conductor coil 110 surrounded by the magnetic bodies 114 is cut across by the magnetic line of force 120. Therefore, the only variable relating to the magnitude of the active force F is the magnitude of the current l in the conductor coil 110, and these are directly proportional; the active force on the conductor coil 110 toward the direction 122 increases with increasing current in the conductor coil 110.

When the conductor coil 110 is pushed forward in the direction 122, the lens cylinder 102 and the lens contained in the lens cylinder 102 are indirectly pushed forward in the direction 122 also because the conductor coil 110 is fastened on the lens cylinder 102. When the lens cylinder 102 is pushed in the direction 122, the coil spring 112 is compressed because a space between the flange 104 and the magnetic bodies 114 is reduced. Thus, the coil spring 112 exerts a reactive force to the lens cylinder 102 toward a direction opposite to the direction 122, and the reactive force increases with increasing compression of the coil spring 112. In other words, if a substantial shift of the lens cylinder 102 is desired, more current should be applied to the conductor coil 110 to generate a more powerful force toward the direction 122, counteracted by the reactive force from the coil spring 112. When the active force and the reactive force are in a state of equilibrium, the lens cylinder 102 and the lens 108 are stably positioned. According to the foregoing description, the lens cylinder 102 can be shifted to a desired location by controlling the magnitude of the current in the conductor coil 110, and then the lens cylinder 102 can return to its original position by stopping the current in the conductor coil 110.

Figure 2B:
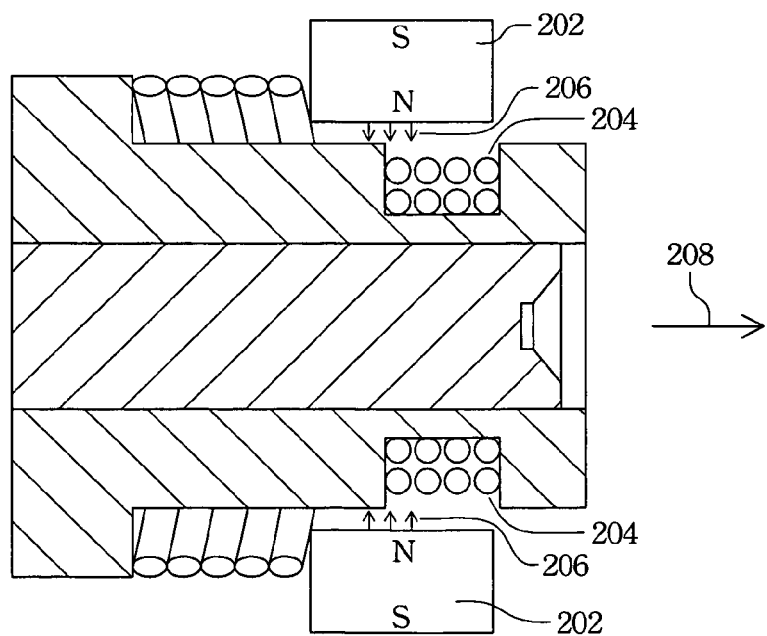
FIG. 2B is a diagram of a lens driving mechanism in motion according to another embodiment of the present invention.

In the embodiment shown in FIG. 2A, the source of the magnetic line of force is constituted by two annular magnetic bodies 114 and an annular inner yoke 116 used for enhancing magnetic flux density. FIG. 2B shows another embodiment according to the present invention, which has just one annular magnetic body. The mechanism shown in FIG. 2B is similar to that in FIG. 2A, except that the source of the magnetic line of force is an annular magnetic body 202, wherein a surface facing a conductor coil 204 of the magnetic body 202 is a positive pole and the surface on the reverse side of the magnetic body 202 is a negative pole. According to the principle previously described, the direction of the magnetic line of force 206 is from the magnet 202 to the conductor coil 204, and the conductor coil 204 is cut across by the magnetic line of force 206. Therefore, an active force toward a direction 208 will be induced when the conductor coil 204 conducts electrical current, and the principle for controlling the mechanism of this embodiment is identical with the embodiment shown in FIG. 2A.

Moreover, the magnetic bodies mentioned previously can be made of any magnetic material which is able to continuously provide a steady magnetic field, such as a general magnet or an electromagnet, and a Neodymium-Iron-Borom (Nd—Fe—B) permanent magnet which has the characteristics of high residual magnetic flux density and high coercive force is used in the embodiment described herein. In addition, the inner yoke mentioned previously can be made of any material with high magnetic conductivity, which is able to converge the magnetic line of force to a uniform magnetic field with high magnetic flux density. The coil spring mentioned can be replaced by any elastomer, such as a flat spring or rubber lump.

According to the foregoing description of the lens driving mechanism, the lens can be shifted to a desired position as long as the conductor coil conducts current with a proper magnitude, and this purpose can be obtained by applying a focus control circuit into a camera with this kind of lens driving mechanism. The focus control circuit is able to compute and output a current with an appropriate magnitude according to real condition; therefore, it may be implemented by a general processor.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens driving mechanism, comprising:
   a lens cylinder, wherein an inside of said lens cylinder is sufficient for containing a lens apparatus, and a flange perpendicularly extending from an outer surface of said lens cylinder;
   a conductor coil wound and fastened on the outer surface of said lens cylinder;
   an elastic component surrounding said lens cylinder;
   a mechanism cylinder, wherein an inside of said mechanism cylinder is sufficient for containing said lens cylinder and said elastic component; and
   a magnetic body disposed on an inner surface of said mechanism cylinder,
   wherein said magnetic body faces said conductor coil when said lens cylinder and said elastic component are placed into said mechanism cylinder, and then a current is conducted in said conductor coil for inducing an active force to push said lens cylinder, and at the same time, said flange and said magnetic body compress said elastic component from two ends of said elastic component separately for inciting a reactive force from said elastic component upon said lens cylinder, wherein a magnitude of said active force is controlled by adjusting a magnitude of said current for a state of equilibrium between said active force and said reactive force, whereby said lens cylinder can be shifted to a desired position.

2. The lens driving mechanism of claim 1, further comprising a trench encircled said lens cylinder in said outer surface of said lens cylinder, and said conductor coil is fastened on said lens cylinder by being wound in said trench.

3. The lens driving mechanism of claim 1, wherein said elastic component is a coil spring.

4. The lens driving mechanism of claim 1, wherein said elastic component is a flat spring.

5. The lens driving mechanism of claim 1, wherein said magnetic body comprises at least one magnet set, wherein each of said at least one magnet set comprises a pair of magnets and an inner yoke between said pair of magnets, and surfaces of each of said pair of magnets, which contact said inner yoke, have identical magnetic polarities.

6. The lens driving mechanism of claim 5, wherein said pair of magnets are Neodymium-Iron-Borom (Nd—Fe—B) permanent magnets.

7. The lens driving mechanism of claim 1, wherein said magnetic body comprises at least one magnet, surfaces of each of said at least one magnet, which face said conductor coil, have identical magnetic polarities.

8. The lens driving mechanism of claim 7, wherein said at least one magnet is a Neodymium-Iron-Borom (Nd—Fe—B) permanent magnet.

9. A camera equipment with a focusing function, comprising:
   a focus control circuit;
   a lens cylinder, wherein an inside of said lens cylinder contains a lens apparatus and a flange perpendicularly extending from an outer surface of said lens cylinder;
   a conductor coil wound and fastened on the outer surface of said lens cylinder and electrically coupled to said focus control circuit;
   an elastic component surrounding said lens cylinder;
   a mechanism cylinder, wherein an inside of said mechanism cylinder is sufficient for containing said lens cylinder and said elastic component; and
   a magnetic body disposed on an inner surface of said mechanism cylinder,
   wherein said magnetic body faces said conductor coil when said lens cylinder and said elastic component are placed into said mechanism cylinder, and then a current is conducted in said conductor coil for inducing an active force to push said lens cylinder, and at the same time, said flange and said magnetic body compress said elastic component from two ends of said elastic component separately to incite a reactive force from said elastic component upon said lens cylinder, wherein a magnitude of said active force is controlled by using said focus control circuit to adjust the magnitude of said current to achieve a state of equilibrium between said active force and said reactive force, whereby said lens cylinder can be shifted to a desired position.

10. The camera equipment of claim 9, wherein said focus control circuit is a processor.

11. The camera equipment of claim 9, further comprising a trench encircling said lens cylinder on said outer surface of said lens cylinder, and said conductor coil is fastened onto said lens cylinder by being wound in said trench.

12. The camera equipment of claim 9, wherein said elastic component is a coil spring.

13. The camera equipment of claim 9, wherein said elastic component is a flat spring.

14. The camera equipment of claim 9, wherein said magnetic body comprises at least one magnet set, wherein each of said at least one magnet set comprises a pair of magnets and an inner yoke between said pair of magnets, and surfaces of each of said pair of magnets, which contact said inner yoke, have identical magnetic polarities.

15. The camera equipment of claim 14, wherein said pair of magnets are Neodymium-Iron-Borom (Nd—Fe—B) permanent magnets.

16. The camera equipment of claim 9, wherein said magnetic body comprises at least one magnet, surfaces of each of said at least one magnet, which face said conductor coil, have identical magnetic polarities.

17. The camera equipment of claim 16, wherein said at least one magnet is a Neodymium-Iron-Borom (Nd—Fe—B) permanent magnet.

* * * * *